United States Patent Office 2,815,581
Patented Dec. 10, 1957

2,815,581

INSTRUMENTS FOR TWO-FLANK TESTING OF TOOTHED WHEELS

Heinz Georg Emil Strelow and Alfons Willy Dinger, Minden, Westphalia, Germany, assignors to Schoppe & Faeser G. m. b. H., Minden, Westphalia, Germany, a limited liability company of Germany Application November 1, 1955, Serial No. 544,320

Claims priority, application Germany November 4, 1954

9 Claims. (Cl. 33—179.5)

The invention herein concerns an advantageous improvement in testing wheels for gear testing devices. A testing wheel in accordance with the invention may be employed in connection with gear testing apparatus following the two-flank rolling test method. In the case of this gear testing method, the toothed wheel to be tested (piece to be tested) is turned against a toothed wheel complying with all requirements of accuracy (testing wheel). One of the two wheels is capable of being displaced in the direction of the straight line connecting the two wheel centers. As a result of inaccuracies in the manufacture of the wheel to be tested, the distance between the axes of the wheels will change in the course of turning. These changes of the distance are measured or recorded (rolling diagram) and indicate any deficiencies of the piece to be tested. The diagram of the rolling motion indicates, among other things, deficiencies in true running, deficiencies in the direction of the teeth and the angle of taper.

Purpose of the invention herein is the obtention of a diagram which, independent from any other deficiencies makes visible the angle of taper and, at least qualitatively, any deficiency regarding the direction of the teeth. This is achieved as follows: In two portions of the circumference each equalling in length at least the circumference of the wheel to be tested, the testing wheel is equipped with teeth in only one of the marginal zones while the remaining part of its height is left empty. Thus, the wheel to be tested is in gear with the testing wheel in only a small portion of the edge in the course of each turn.

Further details pertaining to the invention are described in the examples for practical execution of same:

Figure 1:
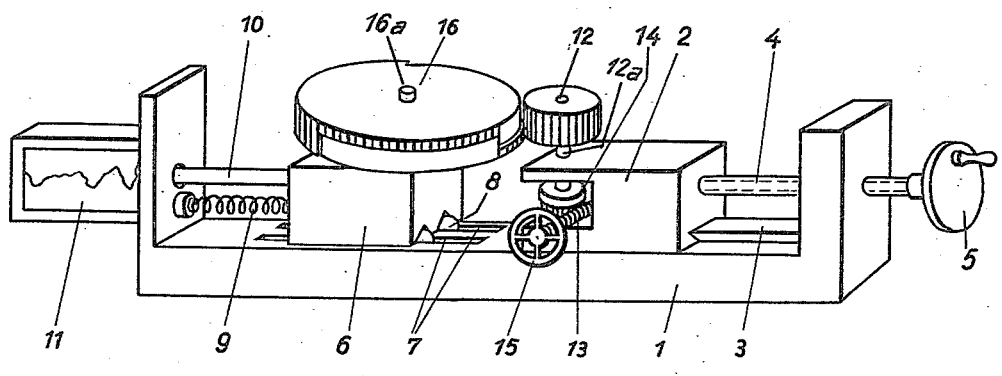
Figure 1 shows a gear testing device operating in accordance with the two-flank rolling test method, to which the testing wheel in accordance with the invention is to be applied.

Figure 1 shows an instrument bed 1 on which a slide 2 is capable of being displaced in a horizontal direction. Slide 2 is guided by a rail 3 and may be displaced by means of a hand wheel 5 which is connected with a screw spindle 4. On the bed 1, a second slide block 6 is likewise movable in a horizontal direction. Said slide block is guided in an easily gliding manner by means of two rows of balls 8 which move in grooves 7. The movements of the slide block 6 are transcribed in a recording device 11 by means of a feeler lever 10. The toothed wheel 12 to be tested is placed on a shaft 12a mounted on the slide block 2 in such a manner that it can be turned by means of the hand wheel 15 via the endless screw 13 and the worm wheel 14. The testing wheel 16 is rotatable freely on the slide block 6, being mounted thereon by a shaft 16a. A spring 9 presses the slide block 6 to the right side and thereby keeps the testing wheel and the wheel to be tested engaged and movements of the block produced during rotation of the wheels are indicated. If a regular toothed wheel is used as a testing wheel, the recordings of the recorder 11 show the various deficiencies of the teeth superimposed and reading of diagrams becomes difficult. For example, a crooked tooth might well register the same type of diagram as a tooth of excessive height, if the testing were done with a conventional test wheel. Hence a low crooked tooth could often be registered as a tooth within limits set for production.

Figure 2:
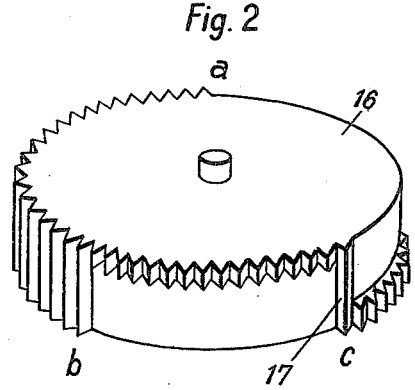
Figure 2 represents a drawing of such a testing wheel.

The testing wheel in accordance with the invention represented in Figure 2 shows only one third of the circumference, between the points a and b, as containing normal toothing extending over the entire width. A second one-third portion, between points b and c, is occupied by toothing over a narrow strip of the width of the wheel along the zone of the upper edge while the remaining third, between points c and a, shows toothing over a narrow marginal zone along the lower edge of the width of the wheel. The length of each individual portion equals at least the circumference of the toothed wheel to be tested. Where the portions join, in point c, one tooth 17 extends over the entire width of the wheel in order to assure continuous rolling during transition from the upper to the lower toothed marginal portion.

Figure 3:
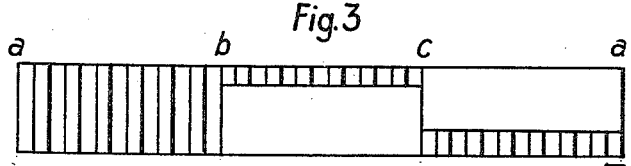
Figure 3 shows the surface of the mantle of said testing wheel which has to be travelled and, Figure 4 shows a diagram which has been recorded by means of said testing wheel.

Figure 3 shows schematically the toothed rim of the testing wheel of this type to be travelled through.

Figure 4:
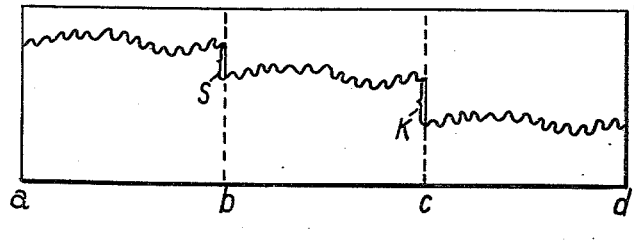

Figure 4 represents a diagram obtained on a recording tape by means of said testing wheel. The higher the ordinate of the recorded curve, the wider the distance between the wheels. The portion of the diagram marked a—b represents the curve resulting from the portion which is equipped with teeth extending over the entire width of the wheel. Those portions of the testing wheel which are equipped with toothing along the edges are reflected in the portions b—c and c—a of the diagram. The jump near c, between the second and third part of the diagram are marked K in the illustration, is an immediate measure of the angle of taper, since of the toothings b—c and c—a of the testing wheel one is in gear with the upper edge and one with the lower edge only of the wheel to be tested. If the wheel to be tested shows an angle of taper to the effect that, as an example, the upper edge of its toothing is further removed from the axis of said wheel to be tested than the lower edge, the distance between the axes of the wheel to be tested and the testing wheel will be large whenever the upper edge is in gear with the testing wheel and small whenever the lower edge is engaged. The difference is represented by the portion K.

The illustration also shows a jump between the portion a—b of the diagram and the upper one of the two remaining parts. The example illustrated in illustration 4 shows the jump in point b. It is indicated by the letter S. The length of the distance S represents a qualitative measure of deficiencies in the direction of the teeth. Whenever the wheel to be tested engages with the full width of the toothing of the testing wheel, the deficient direction of the toothing results in an increase of the distance between the testing wheel and the wheel to be tested; for, the greater the deficiency in the direction of the toothing, the lesser the depth of the meshing of the teeth. On the other hand, the deficiency in the direction of the toothing will not become obvious when the marginal zones are engaged because of the narrowness of these zones. The change in the distance of the axes during the engagement of the wide toothing with the marginal toothing of the testing wheel having the larger diameter thus is a result of a deficiency in the direction of the toothing.

The invention claimed is:

1. Testing wheel provided with toothing for testing of toothed wheels, the toothing of the testing wheel being limited to one of each of the marginal zones of the full width of the said testing wheel in two portions of its circumference equalling each in length at least the circumference of the wheel to be tested, so that each of said marginal zones meshes with the toothing of the wheel to be tested for the length of at least one full turn of said wheel to be tested, with a minimum of one full tooth being placed at the point in which the toothing of one marginal zone meets with the toothing of the other marginal zone.

2. Testing wheel for testing of toothed wheels, said testing wheel being equipped with toothing, the toothing covering the full width of said testing wheel only in one portion of its circumference equalling in length at least the circumference of the wheel to be tested, while in two equally long portions of the circumference of the testing wheel the toothing in each case is limited to one of the two marginal zones of the width of the wheel, with one full tooth being placed at the point of transition of the toothing from one marginal zone to the other.

3. A test wheel for tooth-wheel testing, said test wheel being provided with toothing on its circumference, and including a set of toothing provided only on a section of the circumference, the set being at least of the same length as the circumference of the wheel to be tested and covering the whole width of the wheel, whereas on two equally long sections of the circumference the toothing is limited to one of the two external zones of the width of the wheel.

4. A test wheel for tooth-wheel testing, with a circumference three times larger than the circumference of the wheel to be tested, the circumference of the test wheel being toothed, the toothing of the test wheel covering the whole width of the wheel on one third of the circumference, whereas in the two remaining thirds the toothing is limited to each one of the two external zones.

5. A test wheel for tooth-wheel testing, the circumference of the test wheel being at least three times larger than the circumference of the wheel to be tested and with toothing on its whole circumference, the toothing covering the whole width of the wheel on one third of the circumference, whereas on two equally long sections of the circumference the toothing is limited to each of the two external zones of the width of the test wheel, with a complete tooth at the spot where the toothing passes from one external zone to the other.

6. A test wheel for tooth-wheel testing, the circumference of the test wheel being three times larger than the circumference of the wheel to be tested, the test wheel being provided with toothing in its circumference, on one third of the circumference the toothing covering the whole width of the test wheel, on the two remaining thirds the toothing being limited to each one of the two external zones of the test wheel, and with a complete tooth at the spot where the toothing passes from one external zone to the other.

7. In an instrument for gear testing wherein a sample gear to be tested is rotated against a test wheel and relative displacement of their axes indicates imperfections in the sample gear, a test wheel for tooth-wheel testing, the circumference of the test wheel being at least twice the circumference of the wheel to be tested, the test wheel being provided at its circumference with toothing, including one set of toothing provided on each one marginal zone of the test wheel and of at least the circumferential length of the wheel to be tested and another set of toothing on the other marginal zone of the wheel also of at least the circumferential length of the wheel to be tested, the two sets of toothing being sufficiently spaced in the direction of the axis of the wheel so as to engage separate zones of the teeth of the wheel to be tested and close enough for both sets to engage the teeth of the wheel to be tested, each set of toothing being sequentially displaced along the circumference of the test wheel, each displaced set being peripherally long enough to engage with the wheel to be tested during a complete revolution of the latter, so that during one complete rotation of the test wheel, at least two zones of the toothing of the wheel are independently tested.

8. In an instrument for gear testing wherein a sample gear to be tested is rotated against a test wheel, the test wheel for tooth-wheel testing, the circumference of the test wheel being at least twice the circumference of the wheel to be tested, the test wheel being provided at its circumference with at least two sets of toothing, the first set being limited to each one of the two marginal zones of the test wheel for a peripheral length at least equal to the length of circumference of the wheel to be tested and the second set covering substantially the whole width of the wheel for a peripheral length at least equal to said circumference, each set of toothing being sequentially displaced along the periphery of the test wheel from the other set so that there is separate engagement with each set during a complete revolution of the sample gear.

9. In an instrument for testing gears wherein a sample gear is rotated against a gear with standardized teeth, a standard gear having a set of standardized teeth extending a continuous peripheral distance at least as great as the circumference of the sample gear, the set being on the margin of only one edge of the gear in the direction of the axis thereof, and another set of standardized teeth for meshing with the sample gear in substantially the same manner as the first mentioned set and on the standard gear and at least as long peripherally as the first set and the second set of teeth occupying positions along the width of the standard gear displaced in the direction of the axis of the gear and for the full peripheral length of the second set, for testing different portions of the sample gear along the direction of the axis of the sample gear said sets being sequentially displaced peripherally and the teeth being long enough in the direction of the axis of the standard wheel to engage the sample gear.

References Cited in the file of this patent

UNITED STATES PATENTS

| | | |
|---|---|---|
| 1,696,049 | Miller | Dec. 18, 1928 |
| 1,804,138 | Yeider | May 5, 1931 |
| 2,447,445 | Widen | Aug. 17, 1948 |
| 2,689,410 | Beam | Sept. 21, 1954 |
| 2,715,998 | Stanley | Aug. 23, 1955 |
| 2,726,455 | Saari | Dec. 13, 1955 |